(12) United States Patent
Morcom et al.

(10) Patent No.: US 11,691,630 B2
(45) Date of Patent: Jul. 4, 2023

(54) ROAD SURFACE DETECTION

(71) Applicant: HERE Global B.V., Eindhoven (NL)

(72) Inventors: Charles Morcom, Chicago, IL (US);
Zichen Li, Evanston, IL (US); David Doria, Oak Park, IL (US)

(73) Assignee: HERE Global B.V., Eindhoven (NL)

(*) Notice: Subject to any disclaimer, the term of this patent is extended or adjusted under 35 U.S.C. 154(b) by 1232 days.

(21) Appl. No.: 16/225,829

(22) Filed: Dec. 19, 2018

(65) Prior Publication Data

US 2020/0198641 A1 Jun. 25, 2020

(51) Int. Cl.
| | | |
|---|---|---|
| *G06T 7/521* | (2017.01) | |
| *B60W 40/06* | (2012.01) | |
| *G01S 17/89* | (2020.01) | |
| *G06T 17/20* | (2006.01) | |

(52) U.S. Cl.
CPC .......... *B60W 40/06* (2013.01); *G01S 17/89* (2013.01); *G06T 7/521* (2017.01); *G06T 17/20* (2013.01); *G06T 2207/10028* (2013.01); *G06T 2207/30248* (2013.01)

(58) Field of Classification Search
CPC ........ B60W 40/06; G01S 17/89; G06T 7/521; G06T 17/20
See application file for complete search history.

(56) References Cited

U.S. PATENT DOCUMENTS

| | | | |
|---|---|---|---|
| 8,060,271 B2* | 11/2011 | Dolgov | G06K 9/6297 |
| | | | 701/28 |
| 8,620,089 B1 | 12/2013 | Korah et al. | |
| 8,736,463 B1* | 5/2014 | Zhu | G06T 7/13 |
| | | | 382/104 |
| 9,014,903 B1* | 4/2015 | Zhu | G01C 21/3446 |
| | | | 382/106 |
| 9,330,435 B2 | 5/2016 | Goodman et al. | |
| 9,846,946 B2 | 12/2017 | Fan et al. | |
| 2009/0169052 A1* | 7/2009 | Seki | G06T 7/74 |
| | | | 348/148 |
| 2013/0218472 A1 | 8/2013 | Fu | |

(Continued)

FOREIGN PATENT DOCUMENTS

| | | | | |
|---|---|---|---|---|
| EP | 3287945 A1 | | 2/2018 | |
| IN | 201841003468 | * | 1/2018 | ............ G06V 20/58 |

OTHER PUBLICATIONS

Chang, Y., et al. "Automatic classification of lidar data into ground and non-ground points." International archives of Photogrammetry and Remote Sensing 37.B4 (2008): 463-468.

(Continued)

*Primary Examiner* — Said Broome
(74) *Attorney, Agent, or Firm* — Lempia Summerfield Katz LLC

(57) ABSTRACT

A method for road surface detection includes receiving ranging data including a plurality of ranging data points, extracting one or more ranging data points lying within a height range from the plurality of ranging data points, dividing the one or more ranging data points into one or more grid cells, setting a first horizontal position of a first cell point of a first grid cell of the one or more grid cells as being centered on the first grid cell, setting a first vertical (Continued)

position of the first cell point, and detecting the road surface based on the first vertical position and first horizontal position of the first cell point.

19 Claims, 13 Drawing Sheets

(56) References Cited

U.S. PATENT DOCUMENTS

2017/0146360 A1* 5/2017 Averbuch ........... G01C 21/3679
2018/0059666 A1   3/2018 Izzat et al.

OTHER PUBLICATIONS

Hu, Xiangyun, and Lizhi Ye. "A fast and simple method of building detection from LiDAR data based on scan line analysis." ISPRS Annals of the Photogrammetry, Remote Sensing and Spatial Information Sciences 3 (2013): W1.

Ibrahim, Sherif, and Derek Lichti. "Curb-based street floor extraction from mobile terrestrial LiDAR point cloud. " International Archives of the Photogrammetry, Remote Sensing and Spatial Information Sciences 39 (2012): B5.

McDaniel, Matthew W., et al. "Ground plane identification using LIDAR in forested environments." Robotics and Automation (ICRA), 2010 IEEE International Conference on. IEEE, 2010.

Moosmann, Frank, Oliver Pink, and Christoph Stiller. "Segmentation of 3D lidar data in non-flat urban environments using a local convexity criterion." Intelligent Vehicles Symposium, 2009 IEEE. IEEE, 2009.

Rieken, Jens, Richard Matthaei, and Markus Maurer. "Benefits of using explicit ground-plane information for grid-based urban environment modeling." Information Fusion (Fusion), 2015 18th International Conference on. IEEE, 2015.

Rummelhard, Lukas, et al. "Ground estimation and point cloud segmentation using SpatioTemporal Conditional Random Field." Intelligent Vehicles Symposium (IV), 2017 IEEE. IEEE, 2017.

European Search Report for European Patent Application No. 19217491.0-1206 dated Apr. 30, 2020.

European Office Action for European Patent Application No. 19 217 491.0-1206 dated Apr. 21, 2021.

* cited by examiner

ROAD SURFACE DETECTION

FIELD

The following disclosure relates to the detection of a ground or road surface for autonomous driving.

BACKGROUND

Autonomous vehicles travel along a road and may use sensors to identify features in the environment around the vehicle. In a process called localization, the features in the environment are matched to corresponding features on a map. An autonomous vehicle may identify a surface of the ground or the road in order to analyze the surface or to remove the surface from analysis of other features in the environment.

The road surface may be analyzed to identify information about the physical and logical conditions of the road (e.g. to determine whether there are pot holes or speed bumps in the road). Other features in the environment may be defined relative to the road surface, so detecting the road surface can aid in detecting those features (e.g. curbs, street signs).

SUMMARY

In one embodiment, a method for road surface detection is disclosed. The method includes receiving ranging data including a plurality of ranging data points, extracting one or more ranging data points lying within a height range from the plurality of ranging data points, dividing the one or more ranging data points into one or more grid cells, setting a first horizontal position of a first cell point of a first grid cell of the one or more grid cells as being centered on the first grid cell, setting a first vertical position of the first cell point, and detecting the road surface based on the first vertical position and first horizontal position of the first cell point.

In another embodiment, a vehicle ranging system is disclosed. The vehicle ranging system includes a ranging data interface configured to receive ranging data including a plurality of ranging data points, a ranging data processor configured to extract one or more ranging data points lying within a height range from the plurality of ranging data points and divide the one or more ranging data points into one or more grid cells, a statistics processor configured to determine a most probable ground height of the one or more ranging data points located in the grid cell and determine a value of a median of a range of the one or more ranging data points centered around the most probable ground height, and a grid mesh processor configured to set a horizontal position of a cell point of a grid cell of the one or more grid cells as being centered on the grid cell and set a vertical position of the cell point as the value of the median for the grid cell.

In another embodiment, non-transitory computer-readable medium is disclosed that includes instructions that when executed by a processor are operable to receive ranging data including a plurality of ranging data points, extract one or more ranging data points lying within a height range from the plurality of ranging data points, divide the one or more ranging data points into one or more grid cells, set a first horizontal position of a first cell point of a first grid cell of the one or more grid cells as being centered on the first grid cell, determine a first most probable ground height of the one or more ranging data points located in the first grid cell, determine a value of a first median of a first range of the one or more ranging data points centered around the first most probable ground height, and set a first vertical position of the first cell point as the value of the first median for the first grid cell.

BRIEF DESCRIPTION OF THE DRAWINGS

Exemplary embodiments of the present invention are described herein with reference to the following drawings.

DETAILED DESCRIPTION

Localization by vehicles relies on features in an environment around the vehicle being present in a map. One such environmental feature is a road surface. The road surface may be identified by a vehicle in order to assess information about the physical and logical road. One or more sensors of the vehicle may be directed at the road surface, so a vehicle may have many data points or measurements of the road surface. For example, a light detection and ranging (lidar) sensor may measure the road surface and the environment as the vehicle traverses a path.

In some cases, the road surface may be removed from other data if the localization process does not involve the road. For example, an autonomous vehicle analyzing a building may not need any information about the road surface. Performing localization on the data points relating to a building (e.g. matching a building in the environment to one in a map) may be performed more quickly or with fewer computational resources if the road surface information is removed.

In some other cases, localization may be performed on the road surface or on features defined relative to the road surface. Localization on the road surface may be performed more quickly or with fewer computational resources if information about other features in the environment is removed.

Further, a two-dimensional (2D) occupancy grid may represent the features in the environment. For example, a vehicle may construct a 2D occupancy grid from sensor data or a point cloud. The 2D grid may show occupied space from a top down or "bird's eye" perspective. The road surface may be removed from the sensor data or point cloud prior to constructing the 2D grid so that the grid represents which space in the environment is occupied by a feature and which space is free.

Previous techniques applied to determining a surface of a ground or road include a plane-fitting technique. Plane fitting involves applying a flat plane to a portion of ranging data and determining a position of the plane to minimize the offset from the plane to the ranging data points. Compared to plane fitting, the present road surface detection technique reduces fitting error, reduces fitting bias, and reduces a standard deviation of the error.

Figure 1:
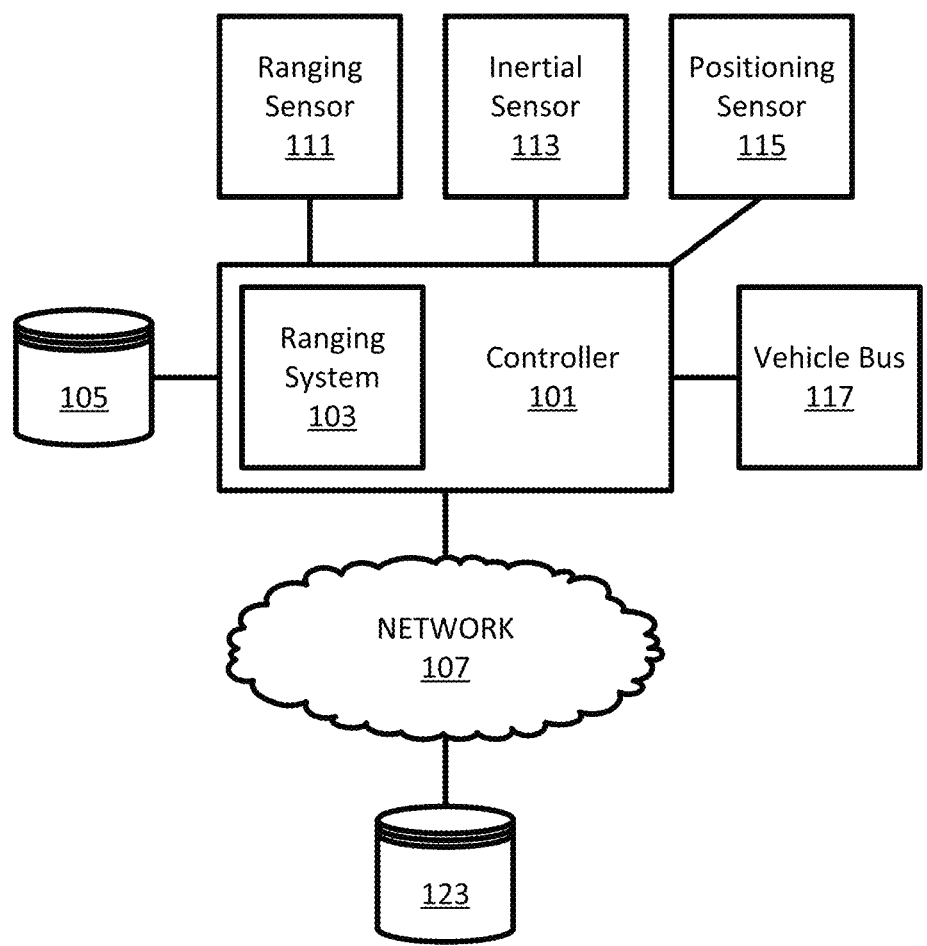
FIG. 1 illustrates an example system for ground surface detection.

FIG. 1 illustrates an example system for ground surface detection. The system includes a controller 101 having a ranging system 103 and in communication with a database 105 and a network 107 through which a database 123 is accessible. The controller 101 may also be connected to a ranging sensor 111, an inertial sensor 113, a positioning sensor 115, and a vehicle bus 117. In some cases, the controller communicates with the sensors 111, 113, and 115 through the vehicle bus 117 or the network 107. More or fewer components may be provided. For example, the controller 101 may not be connected to the database 105 or 123. In another example, the controller 101 is in communication with other sensors such as a speed or steering input sensor.

The controller 101 may interface or communicate with the database 105, the network 107, the ranging sensor 111, inertial sensor 113, positioning sensor 115, and the vehicle bus 117. The connection to the network 107 may be a cellular or other wireless or wired connection. Through the vehicle bus 117, the controller 101 may communicate with other systems of the vehicle such as a motor, brakes, steering, or other systems.

The controller 101 may be located on or implemented by a vehicle such as an automobile, a boat, a train, a helicopter, an airplane, a drone, an unmanned aerial vehicle ("UAV"), or another vehicle. In some cases, the controller 101 may be implemented by a computing device in communication with the vehicle. For example, the controller may be implemented on a server remote from the vehicle and in communication with the vehicle.

The location system 103 may be configured to receive location data from the sensors 111, 113, 115 and the vehicle bus 117. The location data may be a stream of measurements of a position, a distance, an intensity, an angle, a specific force of the vehicle, an angular rate of the vehicle, and a magnetic field surrounding the vehicle or combinations thereof taken by the sensors 111, 113, 115 or the vehicle bus 117. The measurements in the location data may be in the form or order that the measurements are taken by the sensors 111, 113, 115 or the vehicle bus 117. The ranging system 103 may organize the location data into a point cloud.

The database 105 may receive and store the ranging data from the sensors 111, 113, 115 and the vehicle bus 117. Additionally or alternatively, the database 105 may receive and store one or more maps. In some cases, the maps are received from the database 123. In some other cases, the maps may be created or modified by the controller 101 or the location system 103 and stored in the database 105.

The ranging sensor 111 may be a lidar scanner or another sensor. The ranging sensor may measure a distance and an angle. For example, lidar scanners use a rotating mirror to deflect lasers in varying directions. Pulses of lasers may extend radially from the mirror of the lidar scanner. A series of one-dimensional lidar measurements may represent measurements taken as the mirror and laser pulses sweep radially through the environment. The distance to the nearest surface point along any given laser direction is obtained by firing a laser pulse and measuring its time-of-flight (e.g. the time elapsed between firing and returning to the mirror). The sequence of distance measurements obtained by a lidar scanner is thus the result of repeated distance measurements as the laser direction is varied. The lidar sensor may also measure a change in wavelength of the laser pulse from when the laser pulse was sent and when the pulse was received. Multiplying the time of flight by the speed of the laser pulse and dividing in half gives the distance from the lidar sensor to a surface that reflected the laser pulse. The measured angle may be an azimuth angle or a polar angle at which the laser pulse was sent or received by the lidar sensor. The measurements from the lidar scanner may be used to generate the location of a point in space.

The inertial sensor 113 may be an internal measuring unit (IMU) or another sensor. The inertial sensor may use one or more of an accelerometer, a gyroscope, and a magnetometer. The IMU may measure a heading or attitude of the vehicle. The heading or attitude may include a measurement of rotation around a pitch, roll, and yaw axis. From the heading or attitude, the position of the yaw axis may be determined. The yaw axis may correspond to a vertical or upward direction from the vehicle.

The positioning sensor 115 may measure a position of the vehicle. The positioning sensor 115 may be a global positioning sensor. For example, the positioning sensor 115 may operate on a network of satellites such as the global positioning system (GPS) or global navigation satellite system (GLONASS). Measurements from the positioning sensor 115 may be sued to define the path of the vehicle through space.

The vehicle bus 117 may be the internal communications network for the vehicle. The vehicle bus 117 may facilitate communication between the controller 101 and an engine control unit, transmission control unit, anti-lock braking system, or one or more body control modules of the vehicle. The vehicle bus 117 may also communicate with other sensors of the vehicle, such as radar sensors, positioning sensors, and speed sensors. In some cases, the sensors 111, 113, 115 may be connected to the bus and the controller 101 communicates with the sensors 111, 113, 115 via the vehicle bus 117.

Figure 2:
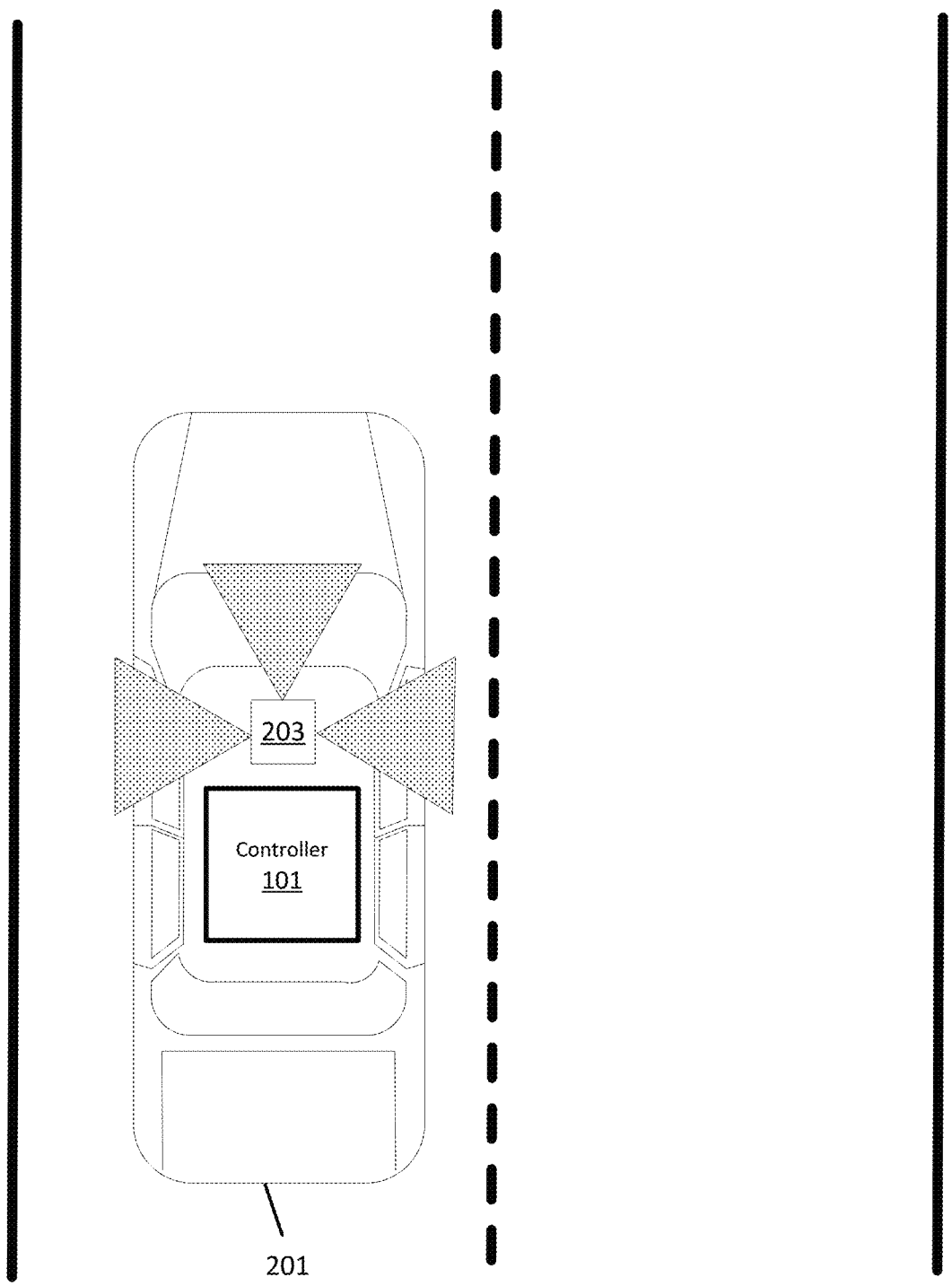
FIG. 2 illustrates an example vehicle ranging system.

FIG. 2 illustrates an example vehicle ranging system. The system may include a vehicle 201 with a sensor 203. The vehicle 201 may also include the controller 101. The vehicle 201 may be an automobile, a boat, a train, a tram, a robot, a drone, a UAV, an airplane, or another vehicle.

The sensor 203 may be supported by the vehicle 201. For example, the sensor 203 may be located on the top or front of the vehicle 201. The sensor 203 may be arranged on the vehicle 201 so that the sensor 203 has a wide view of the environment around the vehicle 201. A field of view of the sensor 203 may extend fully or partially around the vehicle 201. A portion of the field of view of the ranging sensor 203 is shown as the dotted area extending to the sides and in front of the vehicle 201. The sensor may be the network 107, the ranging sensor 111, inertial sensor 113, positioning sensor 115 of FIG. 1. The sensor 203 may be in communication with the controller 101.

Figure 3A:
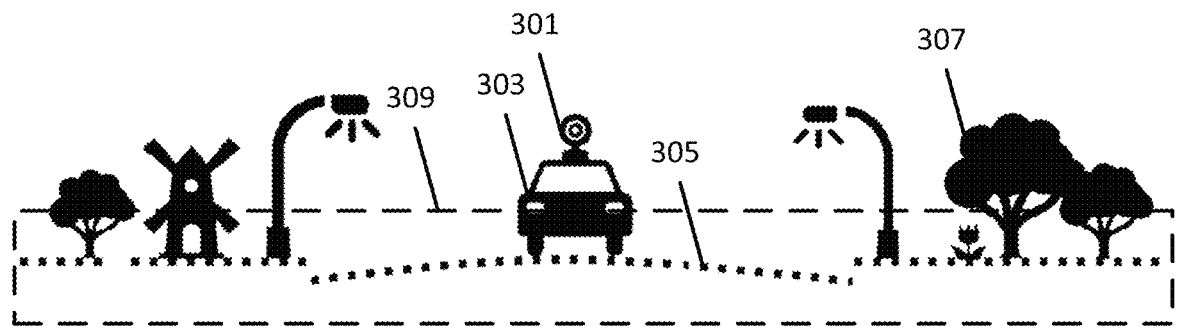
FIG. 3A illustrates an example vehicle ranging system.

FIG. 3A illustrates an example vehicle ranging system. The ranging system may include vehicle sensors 301 attached to a vehicle 303. In some cases, the ranging system 103 may be the ranging system 103 of FIG. 1. The vehicle 303 may be the vehicle 201 of FIG. 2. The vehicle sensors 301 may scan an environment around the vehicle 303 and collect ranging data points 305 of features 307 in the environment. For example, a lidar sensor may collect ranging data points 305 in the environment. In some cases, the ranging system 103 may organize the ranging data points into a point cloud. A subset 309 of the ranging data points 305 may be identified.

The vehicle sensors 301 may include one or more of a ranging sensor, a position sensor, an IMU, an accelerometer, a gyroscope, or a magnetometer. The vehicle sensors 301 may record data and store it with the vehicle 303 or remote from the vehicle 303. The data recorded by the vehicle sensors 301 may include the ranging data 305

The vehicle 303 may be an automobile, a boat, a train, a helicopter, an airplane, a drone, an unmanned aerial vehicle ("UAV"), or another vehicle. The vehicle 303 may traverse a path through the environment. The ranging data points 305 may be collected by the vehicle sensors 301 while the vehicle 303 is stationary or while the vehicle 303 traverses the path. A navigation command for the vehicle 303 may be based on the collected and analyzed ranging data points 305.

The ranging data points 305 may be a measure of the distance from a feature 307 in the environment to the vehicle sensors 301 or the vehicle 303. The vehicle sensors may record the ranging data points 305 in the environment around the vehicle 303. Though a finite amount of the ranging data points 305 are illustrated in FIG. 3A, many ranging data points 305 may be recorded for features 307 above, below, and otherwise around the vehicle 303, including the vehicle 303 itself. In some cases, the ranging data points 305 may be registered in space with a coordinate system.

The ranging data 305 may be registered in space using a coordinate system. Any coordinate system may be used. For example, local coordinates, geographic coordinates, geocentric coordinates, or Cartesian coordinates may be used to register the ranging data points 305. Local coordinates may be a system of indices in a local coordinate space different from but associated with a broader coordinate system. Geographic coordinates may be a coordinate system that describes the location of a point relative to the earth, for example, using latitude, longitude, and elevation. Geocentric coordinates may be a coordinate system representing a point in space using x, y, and z coordinates where the origin is located at the center of mass of the earth. Cartesian coordinates may be a coordinate system that specifies the location of a point uniquely in one or more planes by a set of numerical coordinates representing the distances to the point from two or more perpendicular axes defining the planes and intersecting at an origin point. In some cases, the coordinates are registered relative to a path of the vehicle 303 using a segmented path coordinate system (SPCS).

The features 307 in the environment may be objects in the natural or built landscape. The features 307 may be compared to other features in a map. For example, a localization process may attempt to match features 307 to the features in a map.

A subset 309 of the ranging data points 305 may be identified. In some cases, the vehicle 303 (e.g. a controller 101 of the vehicle 303) may identify the subset 309. In some other cases, a processor remote from the vehicle 303 may identify the subset of the ranging data points 305. The subset 309 may be identified based on criteria. For example, ranging data points 305 may be included in the subset 309 if the ranging data points lie within a predetermined range. The range may be a range of heights. In some cases, the range may be predetermined based on the vehicle 303 or the vehicle sensors 301. For example, the ranging data points 305 that reside in a horizontal region within 1.7 meters to 3.0 meters below the vehicle 303 or the vehicle sensors 301 may be included in the subset 309. Such a range may aid in identifying features 307 such as a road or ground surface. Other ranges and other orientations may be used. Where the ranging data 305 are organized in a point cloud, the subset 309 of ranging data may be removed from the point cloud.

Figure 3B:
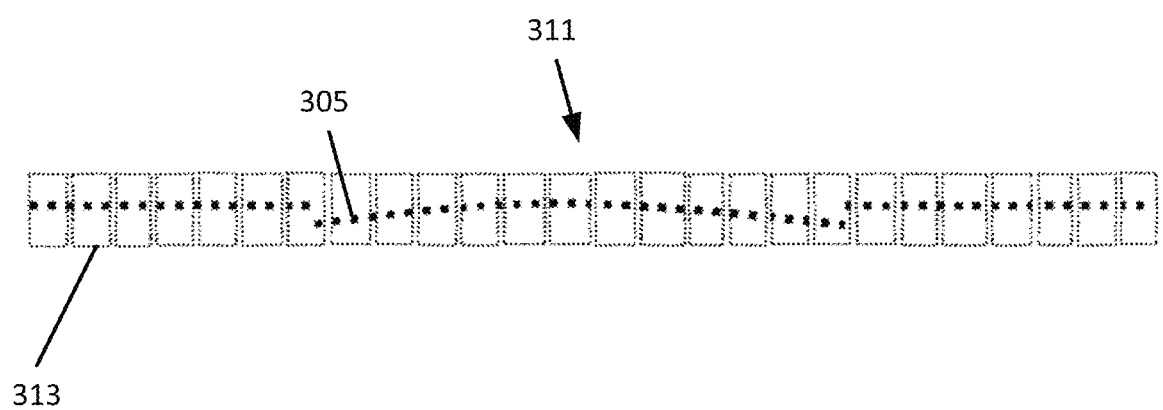
FIG. 3B illustrates an example ranging grid.

FIG. 3B illustrates an example ranging grid 311. The subset 309 of ranging data 305 may be divided into a ranging grid 311 having one or more grid cells 313. Each grid cell 313 may contain one or more ranging data points 305. In some cases, a grid cell 313 may not contain any ranging data 305. The surface of a feature 307 may be identified by determining a coordinate for each grid cell 313 of the ranging grid 311. In some cases, the vehicle 303 (e.g. a controller 101 of the vehicle 303) may be configured to divide the subset 309 of ranging data 305 into the ranging grid 311 and grid cells 313. Each grid cell 313 of the ranging grid may have predetermined dimensions. For example, a grid cell 313 may be 10 centimeters long and 10 centimeters wide. Other dimensions may be used. In some cases, the thickness or width of the range 309 may be used to determine the height of the cell 313. For example, where the range 309 is 1.3 meters thick, the cell 313 may be 1.3 meters tall.

Figure 4:
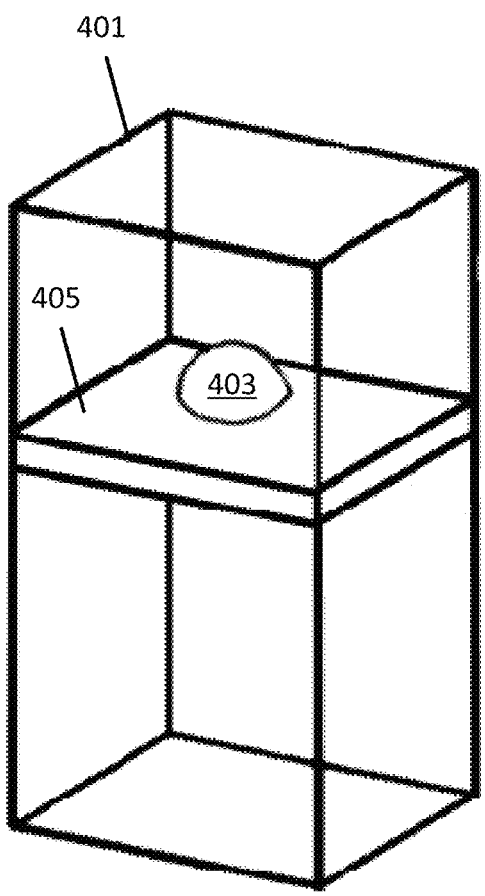
FIG. 4 illustrates an example ranging grid cell.

FIG. 4 illustrates an example ranging grid cell 401. The ranging grid cell may be a grid cell 313 in the grid mesh of FIG. 3. The grid cell 401 may contain a cell point 403. The cell point 403 may define a ground surface 405 for the grid cell 401.

The cell point 403 may be defined for each grid cell 401. The cell point 403 may have a position defined within the grid cell 401. In some cases, the horizontal position of the cell point 403 may be set as centered within the cell 401. For example, where the cell 401 is 10 centimeters long and 10 centimeters wide, the cell point 403 may be positioned 5 centimeters along a wide side of the cell 401 and 5 centimeters along a length of the cell 401.

In some cases, the vertical position of the cell point 403 may be determined based on the ranging data 305 present within the dimensions of the cell 401. For example, the vertical positions of ranging data points 305 within the cell may be gathered together. The vertical positions may be arranged in order from lowest to highest value. A probability density function may be determined for the vertical positions of the ranging data points 305 that describes the probability that each vertical position is the real or actual position of the surface of a feature (e.g. a road or ground surface). A peak or highest probability vertical position may be found from the probability function. For example, a derivative may be taken of the probability density function and points (e.g. at a particular vertical position) where the derivative is equal to zero may be identified as peaks (where the derivative crosses from positive to negative) or troughs (where the derivative crosses from negative to positive). The peaks may be examined and a highest peak (e.g. corresponding to a highest probability) vertical position taken as the vertical position of the cell point 403. Additionally or alternatively, the vertical position of the cell point 403 may be determined from a range of vertical positions around the highest peak. For example, the vertical position of the cell point 403 may be set as the value of a median of the vertical positions within a range of vertical position values centered on the peak. The range may be 20 centimeters wide, encompassing vertical position values for ranging data points 305 within 10 centimeters above or below the vertical position at the highest peak.

The ground surface 405 may be defined for the space encompassed by the grid cell 401. The position of the ground surface 405 may be determined based on the position of the cell point 403 within the cell 401. For example, the vertical position of the ground surface 405 in the cell 401 may be the same as the vertical position of the cell point 403.

Figure 5:
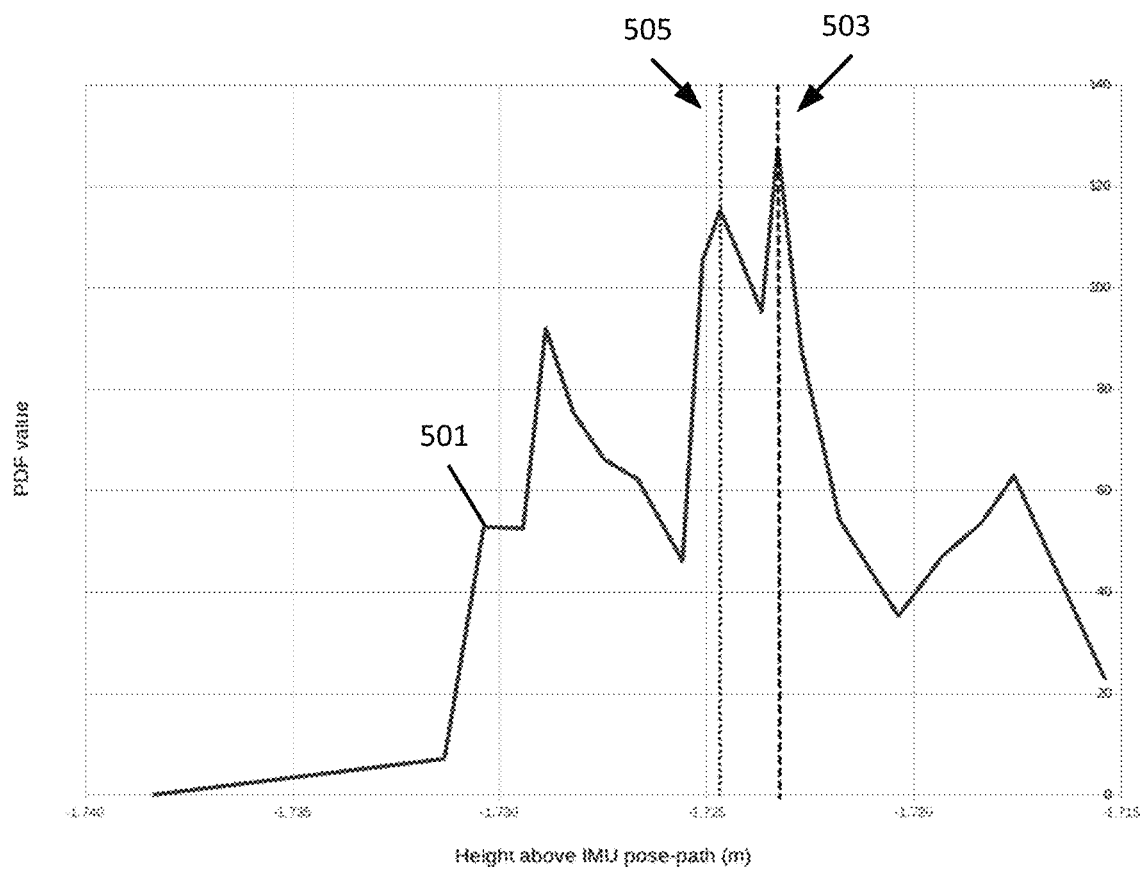
FIG. 5 illustrates an example probability density function.

FIG. 5 illustrates an example probability density function 501. A peak 503 and a median 505 are indicated. The function 501 may be determined based on the ranging data points 305. For example, the ranging data points 305 in a cell 313, 401 may be used. A separate probability density function may be constructed for each cell 313,401 included in the grid mesh 311.

The function 501 may be illustrated by a plotted line. Vertical positions or height may be plotted along the horizontal axis. For example, the horizontal axis may correspond to a height or vertical position of a ranging data point 305. When the ranging data points 305 are organized using cartesian coordinates, the horizontal axis may correspond to the z-value of the ranging data points 305. Where the ranging data points 305 are organized using SPCS coordinates, the horizontal axis may correspond to the h-value (e.g. height above a path) of the ranging data points 305. Values of the probability density function 501 may be plotted along the vertical axis. The value at any point on the line 501 provides a relative probability that the vertical position of a feature is equal to the vertical position of a ranging data point. For example, the value of the function 501 at a particular vertical position (e.g. height) indicates the likelihood that the vertical position is the actual vertical position of the surface of the feature, such as a road or ground surface.

The peak 503 of the function 501 may be determined. For example, as described above with respect to FIG. 4, the peak may be a point where a derivative of the function 501 is equal to zero. The highest peak 503 may indicate the highest probability of the ground surface being at the corresponding vertical position.

In some cases, the vertical position of a cell point may be determined to be equal to the vertical position of the function 501 at the peak 503. In some other cases, the vertical position of a cell point may be determined to be equal to the value of a median 505 of a range centered on the peak 503. For example, ranging data points within 10 centimeters of the peak vertical position may be collected. Other distances may be used for the range. The median 505 of the vertical positions of the ranging data points within the range may be used as the vertical position of the cell point.

Figure 6:
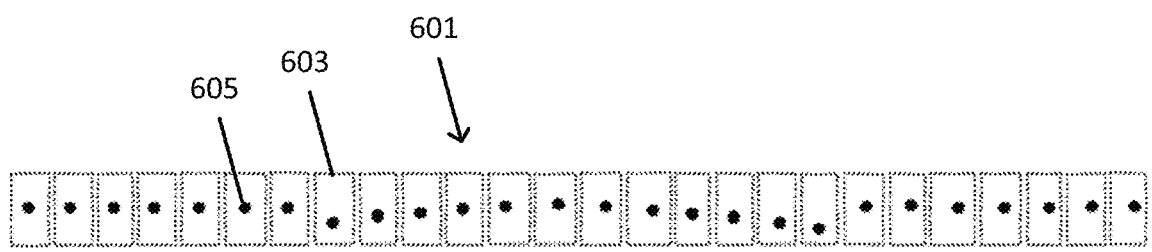
FIG. 6 illustrates an example ground surface mesh.

FIG. 6 illustrates an example surface mesh 601. The mesh 601 may include one or more grid cells 603 having cell points 605. The mesh 601 may describe the surface of a feature, such as a road or ground surface. The mesh 601 may describe the surface using the positions of the cell points 605.

The mesh 601 may be used to extract ranging data points from a point cloud. For example, the ranging data points that are at or below the surface mesh 601 may be segmented from the remaining points in the point cloud. In some cases, the point cloud with the ranging data points removed may be used to construct a 2D occupancy grid.

Figure 7A:
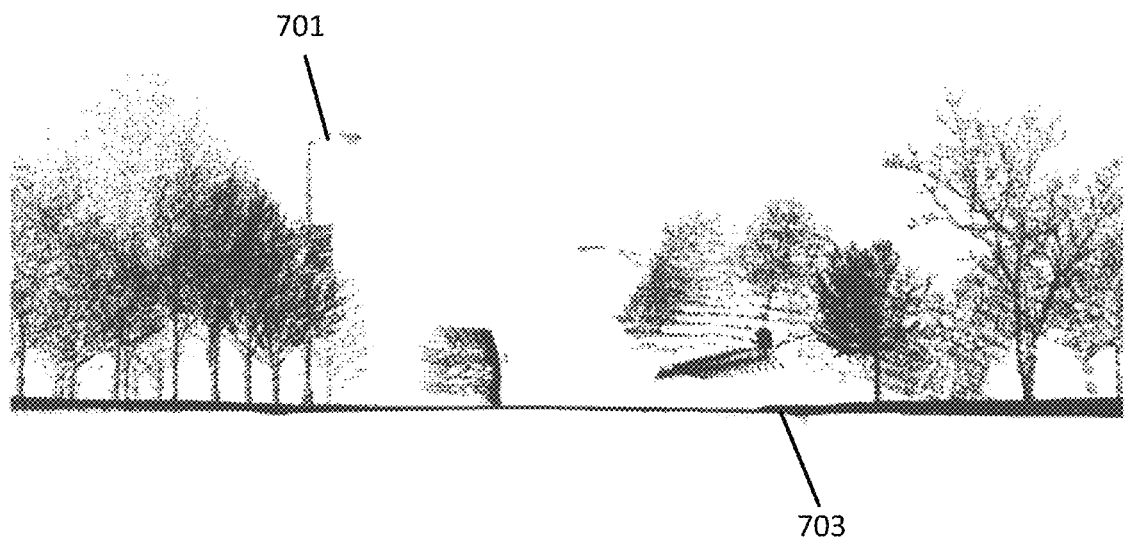
FIG. 7A illustrates an example point cloud.

FIG. 7A illustrates an example point cloud. The point cloud may include ranging data points taken by a sensor of a vehicle. For example, a ranging data sensor on a vehicle may collect the ranging data point for the point cloud. The point cloud may include features 701 in the environment. One such feature may be a curb 703 of a road.

Figure 7B:
FIG. 7B illustrates an example detected ground surface.

FIG. 7B illustrates an example detected ground surface. The surface may describe or include a feature 701, such as the curb 703. The ground surface may be constructed from the point cloud of FIG. 7A. For example, the ground surface may be determined by taking the ranging data in the point cloud, selecting a predetermined range of the ranging data, dividing the range into grid cells with cell points, determining the position of each cell point using a probability density function, and combining the cell points into a mesh.

Figure 8A:
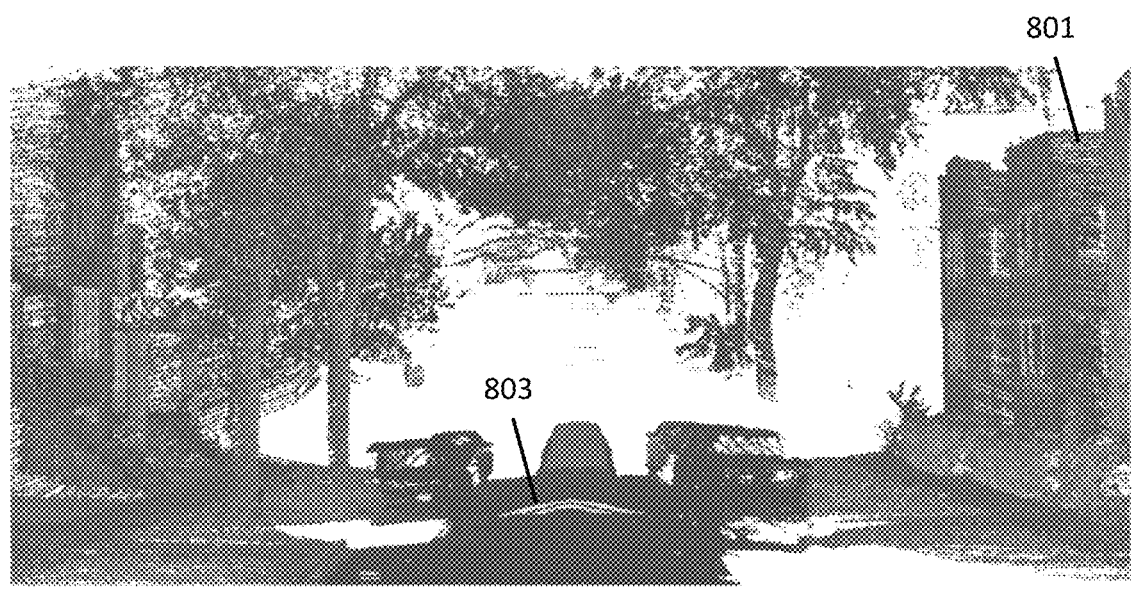
FIG. 8A illustrates another example point cloud.

FIG. 8A illustrates another example point cloud. As in FIG. 7A, the point cloud may include ranging data points taken by a sensor of a vehicle. For example, a ranging data sensor on a vehicle may collect the ranging data point for the point cloud. The point cloud may include features 801 in the environment. One such feature may be a speed hump 703 of a road.

Figure 8B:
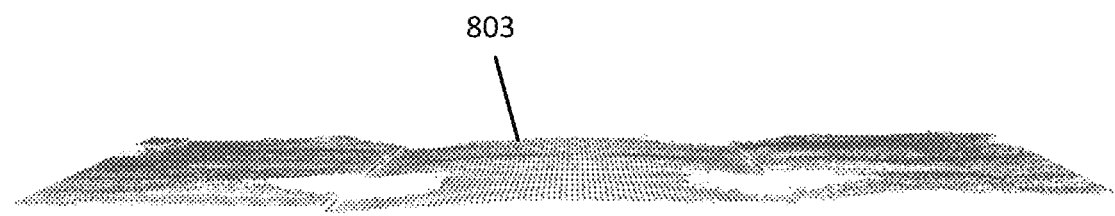
FIG. 8B illustrates another example detected ground surface.

FIG. 8B illustrates another example detected ground surface. The surface may describe or include a feature 801, such as the speed hump 803. The ground surface may be constructed from the point cloud of FIG. 8A. For example, the ground surface may be determined by taking the ranging data in the point cloud, selecting a predetermined range of the ranging data, dividing the range into grid cells with cell points, determining the position of each cell point using a probability density function, and combining the cell points into a mesh.

Figure 9:
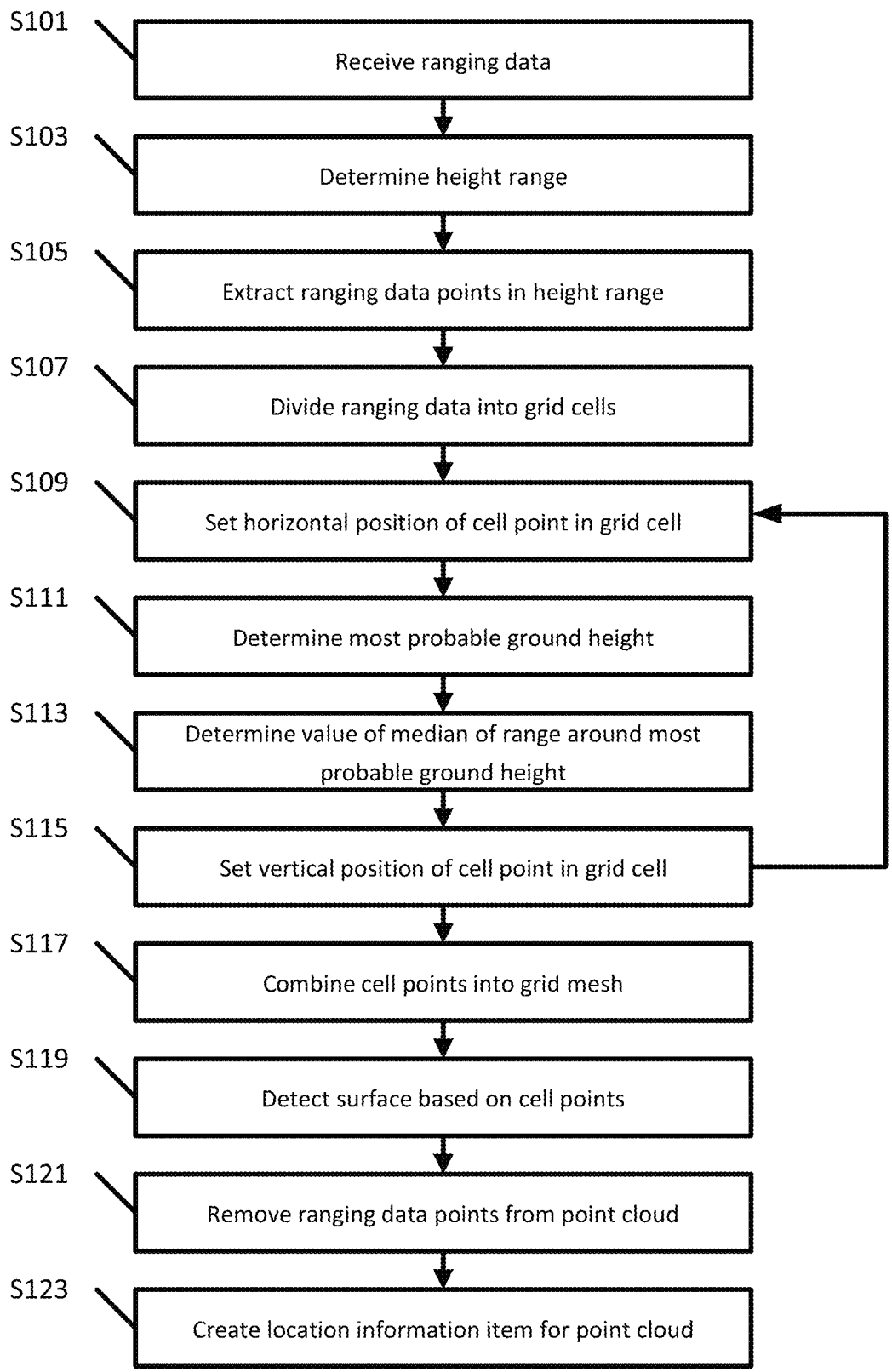
FIG. 9 illustrates an example flowchart for ground surface detection.

FIG. 9 illustrates an example flowchart for ground surface detection. More, fewer, or different acts may be provided. For example, step S121 may be omitted. The acts may be performed in any order. For example, act S109 may follow from act S115. Some acts may be repeated. For example, acts S109-S115 may be repeated for multiple cell points or grid cells. In some cases, a processor may be configured to perform the acts.

In act S101, ranging data is received. The ranging data may be generated by a ranging sensor. For example, a lidar sensor may generate the ranging data. In some cases, the ranging sensor may be attached to or part of a vehicle. The ranging data may be organized into a point cloud of ranging data.

In act S103, a range is determined. The height range may specify a range of heights of ranging data points to be included in the range. The range may be determined relative to a vehicle or a sensor on a vehicle. For example, the range may include all ranging data points in the received ranging data that are between 3 meters and 1.7 meters below a vehicle sensor. In some cases, the vehicle sensor may be an inertial measuring unit of the vehicle. In some other cases, the vehicle sensor may be a lidar device or another sensor or part of the vehicle. Ranges with other sizes may be used.

In act S105, ranging data points within the range are extracted. The range may be applied to the ranging data to select the ranging data points that lie within the range. For example, the range may be a range of heights that is applied to the point cloud of ranging data to select only the ranging data points that lie within the height range.

In act S107, the ranging data points within the height range are divided into one or more grid cells. In some cases, the grid cells may have a uniform size and shape. In some other cases, each grid cell may contain none, one, or more than one ranging data point. Each grid cell may have a cell point that describes the position of a surface within the grid cell. For example, the location of the cell point within the grid cell may describe the position of a surface of the ground or a road within the grid cell.

In act S109, a horizontal position of a cell point of a grid cell is set. The horizontal position may be determined for each cell point of the one or more grid cells. In some cases, the horizontal position of the cell point may be centered within the grid cell. For example, where the grid cell is organized by cartesian coordinates, the x position and the y position may correspond to a horizontal x-y plane within the grid cell and the z-position may indicate a height of the cell point within the grid cell. The cell point may be centered within the grid cell with respect to the x and y axis. Other coordinate systems may be used. For example, where the ranging data points are organized relative to a path, the horizontal position of the cell point may be determined relative to the path. The relative position may be defined or organized by SPCS coordinates.

In act S111, a most probable ground height for the ranging data points in the grid cell is determined. A probability density function may be defined for the ranging data points within a grid cell. The probability density function may describe the probability that a surface measured by the ranging data points based on the vertical positions of the ranging data points. A peak or highest probability vertical position may be chosen as the most likely vertical position of the surface within the ground cell. For example, the vertical position corresponding to the highest peak of the probability density function may be chosen as the vertical position of the surface of the ground or a road within the dimensions of the grid cell.

In act S113, a value of a median a range of ranging data points is determined. The median may include a subset or range of ranging data points within a predetermined distance of the peak. For example, where the peak of the probability density function is equal to 1.75 meters below a reference point (e.g. a vehicle or a vehicle sensor), the range or subset of ranging data points may include ranging data points that are within 1.85 meters to 1.65 meters of the same reference point if the range is 20 centimeters wide and centered on the highest peak vertical position. The median may be taken of the vertical positions of the ranging data points within the range or included in the subset.

In act S115, a vertical position of the cell point of the grid cell is set. In some cases, the vertical position may be determined to be equal to the median value determined in act S113. In some other cases, the vertical position may be determined to be equal to the highest probability vertical position determined in act S111. The vertical position of the cell point may be defined in Cartesian coordinates along a z-axis extending vertically with respect to the grid cell. Additionally or alternatively, the vertical position may be defined relative to a path. For example, the vertical position of the cell point may be defined relative to a path of the vehicle or a vehicle sensor (e.g. a lidar sensor or an inertial sensor). The vertical position of the cell point may be defined as a height above or below the path.

The horizontal and vertical position of the cell point may be defined for each cell point in each grid cell. In some cases, acts S109-S115 may be repeated for each grid cell and cell point.

In act S117, the cell points of the grid cells are combined into a grid mesh. The horizontal and vertical position of each cell point may be included in the grid mesh. The grid mesh may describe the position of a surface. Because each cell point may have a position determined based on the highest probability of the surface in each grid cell, a grid mesh created from the cell points may describe the highest probability of the surface on a larger scale. For example, the grid mesh may represent the position of the surface of the ground or a road.

In act S119, a surface is detected based on the positions of the one or more cell points of the one or more grid cells. The surface, as represented by the grid mesh, may be detected in order to perform localization or another task for the vehicle or ranging data. In some cases, the surface may be detected based on the coordinates of one or more of the cell points.

In act S121, ranging data is removed from the received ranging data based on the grid mesh. In some cases, every ranging data point that is on or below the grid mesh is removed. The ranging data points may be removed from a point cloud. Removal of a ground surface may allow for construction of a 2D occupancy grid from the remaining ranging data. Separating the ranging data of the ground or road from the remainder may make analysis of either part of the ranging data more efficient or less resource intensive. For example, the efficiency of an object detection task directly correlates to the amount of captured ranging data points in a point cloud. Because ranging data points located on the ground or another surface represent a significant portion of all the captured points in the point cloud, removing the points at or below the ground surface may increase efficiency of object detection.

In act S123, a location information item is created for the ranging data. The location information item may be a label, identifier, or classification of the portion of the location information. For example, the location information item may identify a portion of the ranging data as belonging to a feature such as a road surface, a vehicle, a building, or a road sign. In some cases, the location information item may be defined relative to a path. The creation of the location information item may use map-matching. For example, a portion of the ranging data (e.g. the ground surface or the point cloud with the ground surface removed) may be compared to a location of a feature in a map. When the registration of the portion of the ranging data corresponds to the location of the feature in the map, a location information item may be created identifying the portion of the ranging data as being the feature in the map.

Figure 10:
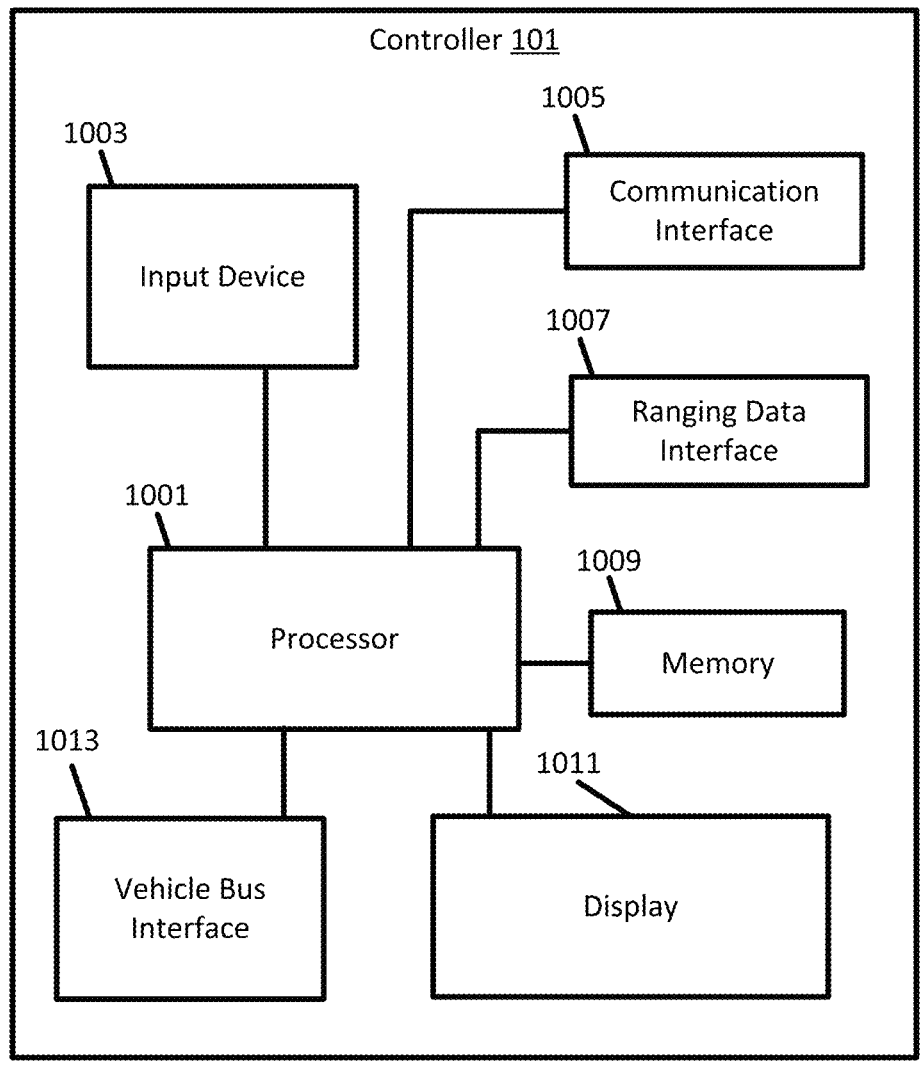
FIG. 10 illustrates an example controller for a vehicle ranging system.

FIG. 10 illustrates an example controller 101 for a vehicle ranging system. The controller may include a processor 1001, an input device 1003, a communication interface 1005, a ranging data interface 1007, a memory 1009, a display 1011, and a vehicle bus interface 1013. Different or fewer components may be present. For example, the controller 101 may not have a display 1011. In another example, the ranging data interface 1007 is part of the communication interface 1005.

The processor 1001 may be a general processor or application specific integrated circuit. In some cases, the processor 1001 is or implements a ranging data processor or pre-processor. The processor 1001 may retrieve instructions from the memory 1009 and execute the instructions.

The input device 1003 may be used for interacting with the controller 101 or to change settings of the controller 101. For example, the input device 1003 may be used to specify a speed at which the ranging sensor 111 rotates. In another example, the input device 1003 may be used to specify a frequency at which laser pulses are sent by the ranging sensor 111.

The communication interface 1005 may provide for the exchange of information between the controller and outside systems. For example, the communication interface 1005 may be coupled with antennas for transmitting and receiving data. In some cases, the communication interface 1005 forms a connection to the network 107. In this way, the communication interface 1005 may allow for the exchange of data between the controller 101 and the database 109. In some other cases, the communication interface 1005 may allow for data exchange between the processor 1001 and sensors. For example, the communication interface 1005 may allow the processor to send and receive information to and from the ranging sensor 111, the inertial sensor 113, or the positioning sensor 115.

The ranging data interface 1007 may allow for the controller 101 to receive a sequence or stream of ranging measurement data from a ranging sensor. Additionally, the ranging data interface 1007 may allow the controller 101 to send commands to the ranging device. In some cases, the ranging device interface may be part of or implemented by the communication interface 1005 or the vehicle bus interface 1013.

The memory 1009 may be a volatile memory or a non-volatile memory. The memory 1009 may include one or more of a read only memory (ROM), random access memory (RAM), a flash memory, an electronic erasable program read only memory (EEPROM), or other type of memory. The memory 1009 may be removable from the DCP, such as a secure digital (SD) memory card. The memory 1009 may store instructions to cause the processor 1001 to implement the ranging system 103. The memory may be configured to store the series of ranging data and the ranging template.

The display 1011 may be a liquid crystal display (LCD) panel, light emitting diode (LED) screen, thin film transistor screen, or another type of display. The output interface of the display 1011 may also include audio capabilities, or speakers. The display 1011 may indicate a status or other information about the controller 101 or the ranging sensor 111.

The vehicle bus interface 1013 may provide a connection to the internal communications network for the vehicle. For example, the vehicle bus interface 1013 may implement a connection between the controller 101 and the vehicle bus 117. The vehicle bus interface 1013 may allow for the transfer of information between the controller 101 and one or more vehicle systems on the vehicle bus such as an engine control unit, transmission control unit, anti-lock braking system, or one or more body control modules of the vehicle.

Figure 11:
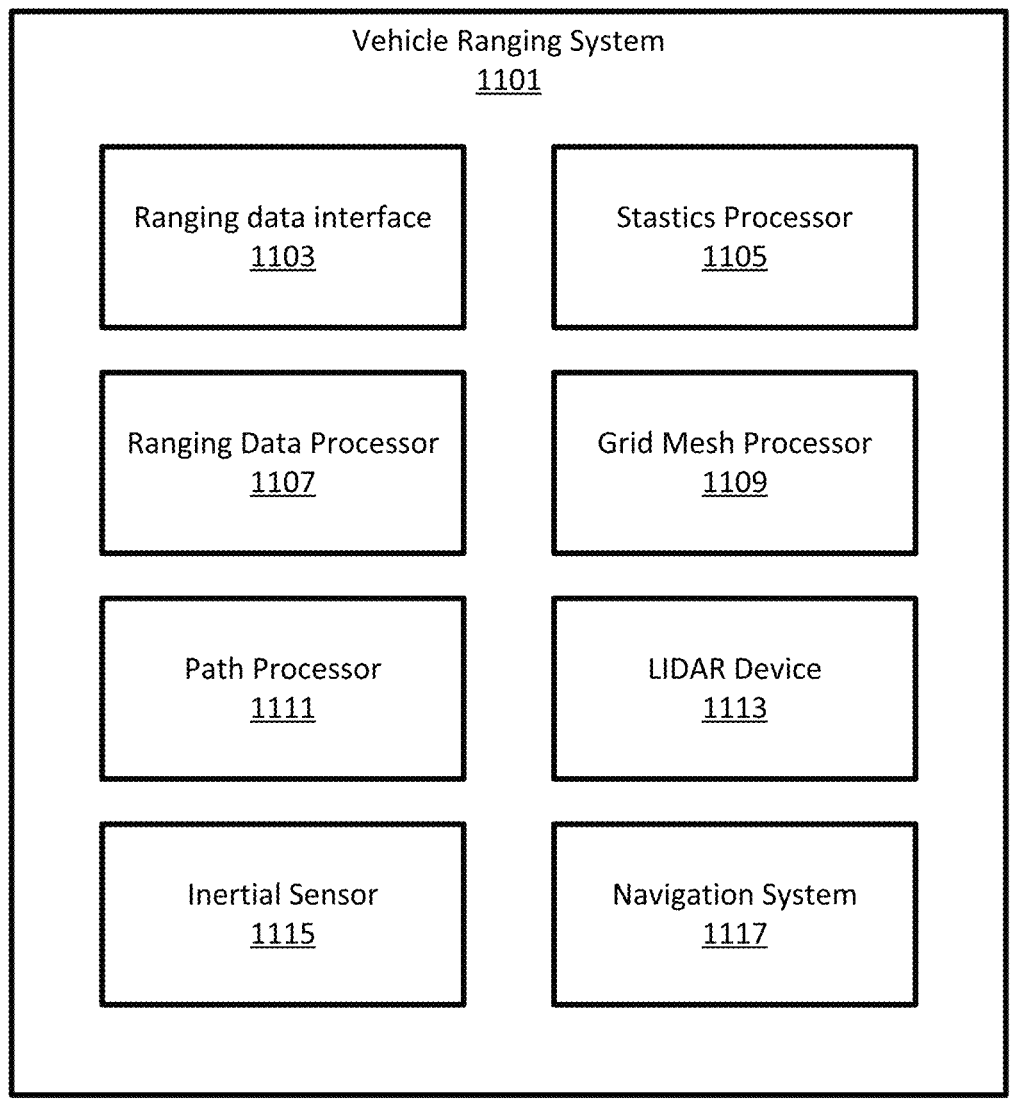
FIG. 11 illustrates a further example vehicle ranging system.

FIG. 11 illustrates a further example vehicle ranging system 1101. The vehicle ranging system 1101 may include a ranging data interface 1103, a statistics processor 1105, a ranging data processor 1107, a grid mesh processor 1109, a path processor, a lidar device 1113, an inertial sensor 1115, and a navigation system. More, different, or fewer components may be provided. For example, the ranging data interface 1103 may be part of another communication interface such as the communication interface 1005 or the vehicle bus interface 1013 of FIG. 10. The vehicle ranging system 1101 may be implemented by the controller 101 of FIG. 1 or by a computing device remote to the controller 101.

The ranging data processor 1103 may include or be implemented by a receiver and a transmitter. The ranging data interface 1103 may be configured for digital or analog communication with one or more ranging data sensors. The ranging data interface 1103 may include one or more amplifiers, digital to analog converters, or analog to digital converters.

The ranging data interface 1103 may be configured to receive ranging data. For example, the ranging data interface may receive location data from the lidar device 1113. The ranging data may be organized in a point cloud. For example, the ranging data may include a point cloud of ranging data points from the lidar device. Additionally or alternatively, the ranging data interface may provide the received ranging data points to another component for constructing a point cloud from the received ranging data points. In some cases, the ranging data processor 1107 may construct the point cloud. The received ranging data may be organized by a coordinate system. For example, the ranging data may be organized by local coordinates, geographic coordinates, geocentric coordinates, or cartesian coordinates. In another example, the ranging data is organized by path specific coordinates, such as SPCS coordinates.

The statistics processor 1105 may be configured to determine a most probable ground height of the one or more ranging data points located in a grid cell. The most probable ground height may be determined for each grid cell using a probability density function of the ranging data points in each grid cell. The statistics processor 1105 may be configured to determine a median of a range of ranging data points centered on the value of the most probable ground height.

The ranging data processor 1107 may be configured to extract a range or subset of ranging data from the received ranging data. For example, the ranging data processor 1107 may extract one or more ranging data points lying within a height range from the received ranging data. The height range as being a range of the plurality of ranging data points below the inertial sensor 1115. In some cases, the ranging data processor 1107 may be configured to divide the extracted ranging data points into grid cells. The ranging data may be extracted from a point cloud of ranging data. Additionally or alternatively, the ranging data processor 1107 may be configured to remove ranging data points lying at or below a surface mesh from the received ranging data or the point cloud of ranging data.

The grid mesh processor 1109 may be configured to set a horizontal and a vertical position of a cell point of a grid cell. The horizontal position may be set so as to center the cell point within the grid cell. The vertical position of the cell point may be set based on the value of the median or the value of the most probable ground height, e.g. as determined by the statistics processor 1105. The horizontal position and the vertical position of the cell point may be organized by non-cartesian coordinates relative to a path of the vehicle ranging system 1101. The grid mesh processor may be configured to create a grid mesh representing a ground surface using the cell point using one or more cell points of the grid cells.

The path processor 1111 may be configured to generate a 2D occupancy grid. The path processor 1111 may create the 2D occupancy grid based on a point cloud with a ground surface or the ranging data points at or below the ground surface removed. The occupancy grid may be a top-down projection of the remaining points in the point cloud after the ground surface has been removed.

The lidar device 1113 may be configured to generate ranging data. The lidar device may be the ranging sensor 111. The ranging data may measure the distance, position, or location of features in the environment around the path or vehicle.

The inertial sensor 1115 may be configured to generate inertial data. The inertial sensor 1115 may be the inertial sensor 113. In some cases, the inertial sensor 1115 is an IMU.

The navigation system 1117 may be configured to configured to generate a navigation instruction based on the two-dimensional occupancy grid. The navigation instruction may be an autonomous driving command (e.g. slow down) or navigation warning (e.g. curves ahead)

Figure 12:
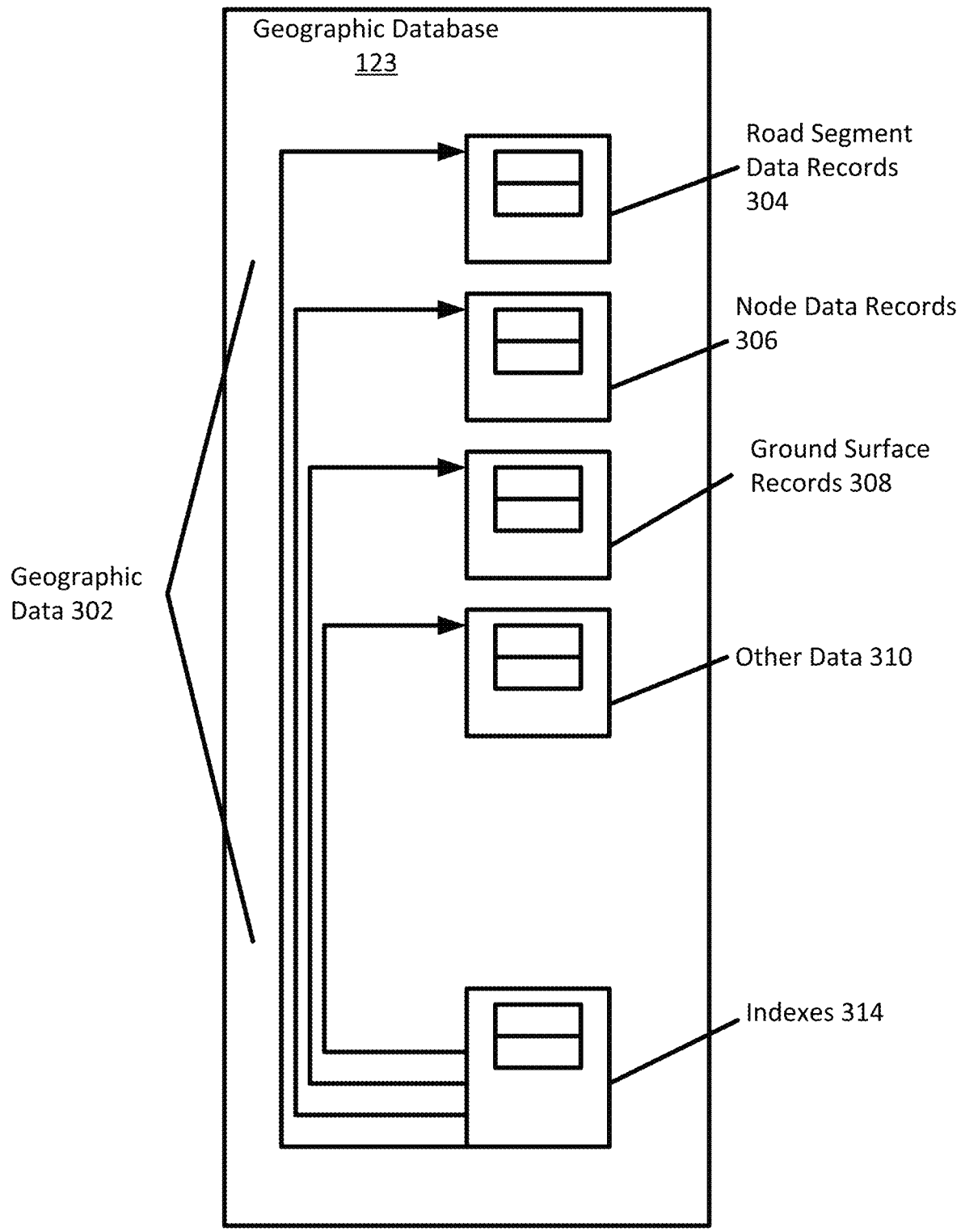
FIGS. 12 and 13 illustrate example geographic databases.

In FIG. 12, the geographic database 123 may contain at least one road segment database record 304 (also referred to as "entity" or "entry") for each road segment in a particular geographic region. The geographic database 123 may also include a node database record 306 (or "entity" or "entry")

for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate ground surface records 308 with a road segment in the segment data records 304 or a geographic coordinate. An index 314 may, for example, store ground surface records 308 relating to one or more locations. The ground surface records 308 may include a position of a surface of the ground in one or multiple coordinate systems.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 13:
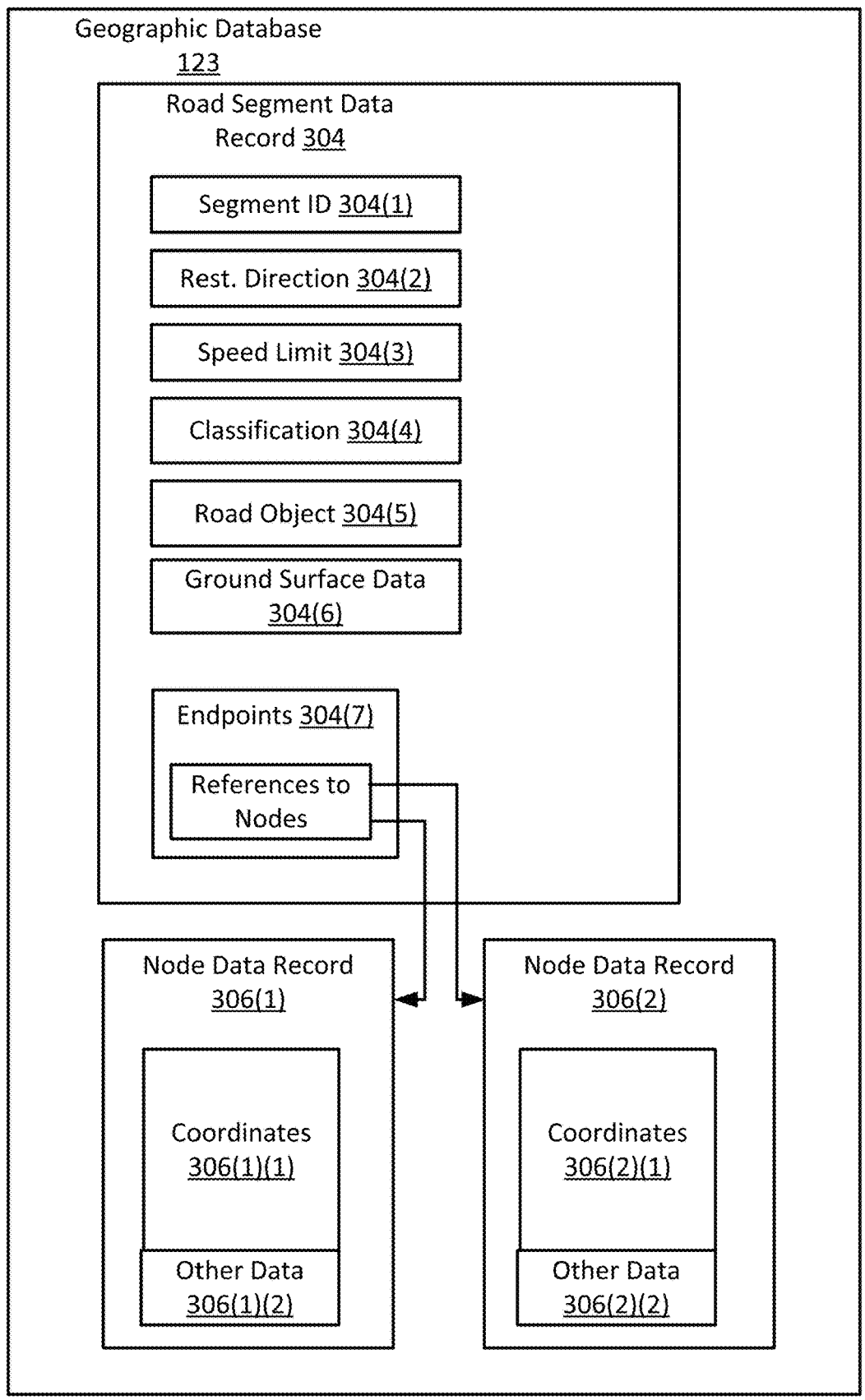

FIG. 13 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data records may further describe a surface of the road segment. In some cases, ground surface data 304(6) may describe the surface of the road segment. The ground surface data 304(6) may include boundaries, dimensions, mesh representations, or other identifiers of the ground surface. For example, the ground surface data may contain a mesh describing the surface of the road segment. The mesh may include one or more points indicating a position on the surface of the road segment. The ground surface data 304(6) may change dynamically over time. The ground surface data 304(6) may be used for map matching with location data from a vehicle.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. In another embodiment, the data 304(7) provides SPCE coordinates for the road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 9 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node The node data records 306(1) and 306(2) may also include other data 306(1)(2) and 306(2)(2) that refer to various other attributes of the nodes. The ground surface data 306(1)(2) and 306(2)(2) may be used for map matching with location data from a vehicle.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used The geographic database 123 and the data stored within the geographic database 123 may be licensed or delivered on-demand. Other navigational services or traffic server providers may access the location fingerprint data, traffic data and/or the lane line object data stored in the geographic database 123.

The controller 101 and/or processor 1001 may include a general processor, digital signal processor, an application specific integrated circuit (ASIC), field programmable gate array (FPGA), analog circuit, digital circuit, combinations thereof, or other now known or later developed processor. The controller 101 and/or processor 1001 may be a single device or combinations of devices, such as associated with a network, distributed processing, or cloud computing.

The memory 1009 may be a volatile memory or a non-volatile memory. The memory 1009 may include one or more of a read only memory (ROM), random access memory (RAM), a flash memory, an electronic erasable program read only memory (EEPROM), or other type of memory. The memory 1009 may be removable from the controller, such as a secure digital (SD) memory card.

The communication interface 1005 may include any operable connection. An operable connection may be one in which signals, physical communications, and/or logical communications may be sent and/or received. An operable connection may include a physical interface, an electrical interface, and/or a data interface. The communication interface 1005 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 1003 may be one or more buttons, keypad, keyboard, mouse, stylus pen, trackball, rocker switch, touch pad, voice recognition circuit, or other device or component for inputting data to the controller 101. The input device 1003 and display 1011 may be combined as a touch screen, which may be capacitive or resistive. The display 1011 may be a liquid crystal display (LCD) panel, light emitting diode (LED) screen, thin film transistor screen, or another type of display. The output interface of the display 611 may also include audio capabilities, or speakers. In an embodiment, the input device 1003 may involve a device having velocity detecting abilities.

The positioning sensor 115 may include suitable sensing devices that measure the traveling distance, speed, direction, and so on, of the vehicle 201 or the controller 101. The positioning system may also include a receiver and correlation chip to obtain a GPS signal. Alternatively or additionally, the one or more detectors or sensors may include an accelerometer and/or a magnetic sensor built or embedded into or within the interior of the vehicle 201 or the controller 101. The accelerometer is operable to detect, recognize, or measure the rate of change of translational and/or rotational movement of the vehicle 201 or the controller 101. The magnetic sensor, or a compass, is configured to generate data indicative of a heading of the vehicle 201 or the controller 101. Data from the accelerometer and the magnetic sensor may indicate orientation of the vehicle 201 or the controller 101. The vehicle 201 or the controller 101 receives location data from the positioning system. The location data indicates the location of the vehicle 201 or the controller 101.

The positioning sensor 115 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning sensor 115 may include suitable sensing devices that measure the traveling distance, speed, direction, and so on, of the vehicle 201 or the controller 101. The positioning system may also include a receiver and correlation chip to obtain a GPS signal. The vehicle 201 or the controller 101 receives location data from the positioning system. The location data indicates the location of the vehicle 201 or the controller 101.

The position sensor 115 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for road surface detection, the method comprising:

receiving, by a processor, ranging data including a plurality of ranging data points;

extracting, by the processor, one or more ranging data points lying within a height range from the plurality of ranging data points;

dividing, by the processor, the one or more ranging data points into one or more grid cells;

setting, by the processor, a first horizontal position of a first cell point of a first grid cell of the one or more grid cells as being centered on the first grid cell;

setting, by the processor, a first vertical position of the first cell point; and detecting, by the processor, the road surface based on the first vertical position and first horizontal position of the first cell point.

Embodiment 2

The method of embodiment 1, further comprising:

determining, by the processor, a first most probable ground height of the one or more ranging data points located in the first grid cell.

Embodiment 3

The method of any of embodiments 1 and 2, further comprising:

determining, by the processor, a value of a first median of a first range of the one or more ranging data points centered around the first most probable ground height; and setting, by the processor, the first vertical position of the first cell point as the value of the first median for the first grid cell.

Embodiment 4

The method of any of embodiments 1-3, wherein the ranging data points are generated by a light detection and ranging (LIDAR) device and organized in a point cloud.

Embodiment 5

The method of any of embodiments 1-4, wherein the LIDAR device is installed on a vehicle, and wherein the first horizontal position and the first vertical position of the first cell point are organized by non-cartesian coordinates relative to a path of the vehicle

Embodiment 6

The method of any of embodiments 1-5, further comprising:

determining, by the processor, the height range as being a range of the plurality of ranging data points below an inertial sensor of a vehicle.

Embodiment 7

The method of any of embodiments 1-6, further comprising:

setting, by the processor, a second horizontal position of a second cell point of a second grid cell of the one or more grid cells as being centered on the second grid cell;

determining, by the processor, a second most probable ground height of the one or more ranging data points located in the second grid cell;

determining, by the processor, a value of a second median of a second range of the one or more ranging data points centered around the second most probable ground height;

setting, by the processor, a second vertical position of the second cell point as the value of the second median for the second grid cell; and combining, by the processor, the first cell point and the second cell point into a grid mesh representing a ground surface.

Embodiment 8

The method of any of embodiments 1-7, further comprising: removing, by the processor, ranging data points of the one or more ranging data points located at or below the grid mesh from a point cloud.

Embodiment 9

The method of any of embodiments 1-8, further comprising:

creating, by the processor, a location information item for the point cloud with the one or more ranging data points located at or below the grid mesh removed or for the one or more ranging data points removed from the point cloud.

Embodiment 10

The method of any of embodiments 1-9, wherein the first range of ranging data includes the one or more ranging data points within a predetermined distance of the first most probable ground height.

Embodiment 11

The method of any of embodiments 1-10, wherein the first most probable ground height is based on a probability density function of the one or more ranging data points located in the first grid cell.

Embodiment 12

An apparatus, configured to perform and/or control the method of any of embodiments 1-11 or comprising means for performing and/or controlling any of embodiments 1-11.

Embodiment 13

An apparatus, comprising at least one processor and at least one memory including computer program code for one or more programs, the at least one memory and the computer program code configured to, with the at least one processor, to perform and/or control the method of any of embodiments 1-11.

Embodiment 14

A computer program comprising instructions operable to cause a processor to perform and/or control the method of any of embodiments 1-11, when the computer program is executed on the processor.

We claim:

1. A method for road surface detection, the method comprising:
   receiving, by a processor, ranging data including a plurality of ranging data points;
   extracting, by the processor, one or more ranging data points lying within a height range from the plurality of ranging data points;
   dividing, by the processor, the one or more ranging data points into one or more grid cells;
   determining, by the processor, a first ground height of the one or more ranging data points located in a first grid cell of the one or more grid cells;
   setting, by the processor, a first horizontal position of a first cell point of the first grid cell of the one or more grid cells as being centered on the first grid cell;
   setting, by the processor, a first vertical position of the first cell point; and
   detecting, by the processor, the road surface based on the first vertical position and first horizontal position of the first cell point.

2. The method of claim 1, further comprising:
   determining, by the processor, a value of a first median of a first range of the one or more ranging data points centered around the first ground height; and
   setting, by the processor, the first vertical position of the first cell point as the value of the first median for the first grid cell.

3. The method of claim 2, wherein the ranging data points are generated by a light detection and ranging (LIDAR) device and organized in a point cloud.

4. The method of claim 3, wherein the LIDAR device is installed on a vehicle, and wherein the first horizontal position and the first vertical position of the first cell point are organized by non-cartesian coordinates relative to a path of the vehicle.

5. The method of claim 2, further comprising:
   determining, by the processor, the height range as being a range of the plurality of ranging data points below an inertial sensor of a vehicle.

6. The method of claim 2, further comprising:
   setting, by the processor, a second horizontal position of a second cell point of a second grid cell of the one or more grid cells as being centered on the second grid cell;
   determining, by the processor, a second ground height of the one or more ranging data points located in the second grid cell;
   determining, by the processor, a value of a second median of a second range of the one or more ranging data points centered around the second ground height;
   setting, by the processor, a second vertical position of the second cell point as the value of the second median for the second grid cell; and
   combining, by the processor, the first cell point and the second cell point into a grid mesh representing a ground surface.

7. The method of claim 6, further comprising:
   removing, by the processor, ranging data points of the one or more ranging data points located at or below the grid mesh from a point cloud.

8. The method of claim 7, further comprising:
   creating, by the processor, a location information item for the point cloud with the one or more ranging data points located at or below the grid mesh removed or for the one or more ranging data points removed from the point cloud.

9. The method of claim 2, wherein the first range of ranging data includes the one or more ranging data points within a predetermined distance of the first ground height.

10. The method of claim 1, wherein the first ground height is based on a probability density function of the one or more ranging data points located in the first grid cell.

11. A vehicle ranging system comprising:
    a ranging data interface configured to receive ranging data including a plurality of ranging data points;
    a ranging data processor configured to extract one or more ranging data points lying within a height range from the plurality of ranging data points and divide the one or more ranging data points into one or more grid cells;
    a statistics processor configured to determine a ground height of the one or more ranging data points located in the grid cell and determine a value of a median of a range of the one or more ranging data points centered around the ground height; and
    a grid mesh processor configured to set a horizontal position of a cell point of a grid cell of the one or more grid cells as being centered on the grid cell and set a vertical position of the cell point as the value of the median for the grid cell.

12. The vehicle ranging system of claim 11, further comprising:
    a light detection and ranging (LIDAR) device configured to generate the ranging data points, wherein the ranging data points are organized in a point cloud.

13. The vehicle ranging system of claim 12, wherein the grid mesh processor is configured to create a grid mesh representing a ground surface using the cell point, wherein the ranging data processor is further configured to remove ranging data points of the one or more ranging data points located at or below the grid mesh from the point cloud, and wherein the system further comprises:
    a path processor configured to generate a two-dimensional occupancy grid based on the point cloud with the ranging data below the grid mesh removed.

14. The vehicle ranging system of claim 13, further comprising:
    a navigation system configured to generate a navigation instruction based on the two-dimensional occupancy grid.

15. The vehicle ranging system of claim 11, further comprising:
    an inertial sensor;
    wherein the ranging data processor is further configured to determine the height range as being a range of the plurality of ranging data points below the inertial sensor.

16. The vehicle ranging system of claim 11, wherein the horizontal position and the vertical position of the cell point are organized by non-cartesian coordinates relative to a path of the vehicle ranging system.

17. The vehicle ranging system of claim 11, wherein the ground height is based on a probability density function of the one or more ranging data points located in the grid cell.

18. A non-transitory computer-readable medium including instructions that when executed by a processor are operable to:
    receive ranging data including a plurality of ranging data points;
    extract one or more ranging data points lying within a height range from the plurality of ranging data points;
    divide the one or more ranging data points into one or more grid cells;
    set a first horizontal position of a first cell point of a first grid cell of the one or more grid cells as being centered on the first grid cell;
    determine a first ground height of the one or more ranging data points located in the first grid cell;
    determine a value of a first median of a first range of the one or more ranging data points centered around the first ground height; and
    set a first vertical position of the first cell point as the value of the first median for the first grid cell.

19. The non-transitory computer-readable medium of claim 18, further comprising instructions operable to:
    set a second horizontal position of a second cell point of a second grid cell of the one or more grid cells as being centered on the second grid cell;
    determine a second ground height of the one or more ranging data points located in the second grid cell;
    determine a value of a second median of a second range of the one or more ranging data points centered around the second ground height;
    set a second vertical position of the second cell point as the value of the second median for the second grid cell;
    combine the first cell point and the second cell point into a grid mesh representing a ground surface;
    remove ranging data points of the one or more ranging data points located at or below the grid mesh from a point cloud; and
    create a location information item for the point cloud with the one or more ranging data points located at or below the grid mesh removed or for the one or more ranging data points removed from the ranging data.

\* \* \* \* \*